(No Model.) 2 Sheets—Sheet 1.
L. B. PHELPS.
LAND ROLLER AND HARROW.
No. 380,131. Patented Mar. 27, 1888.
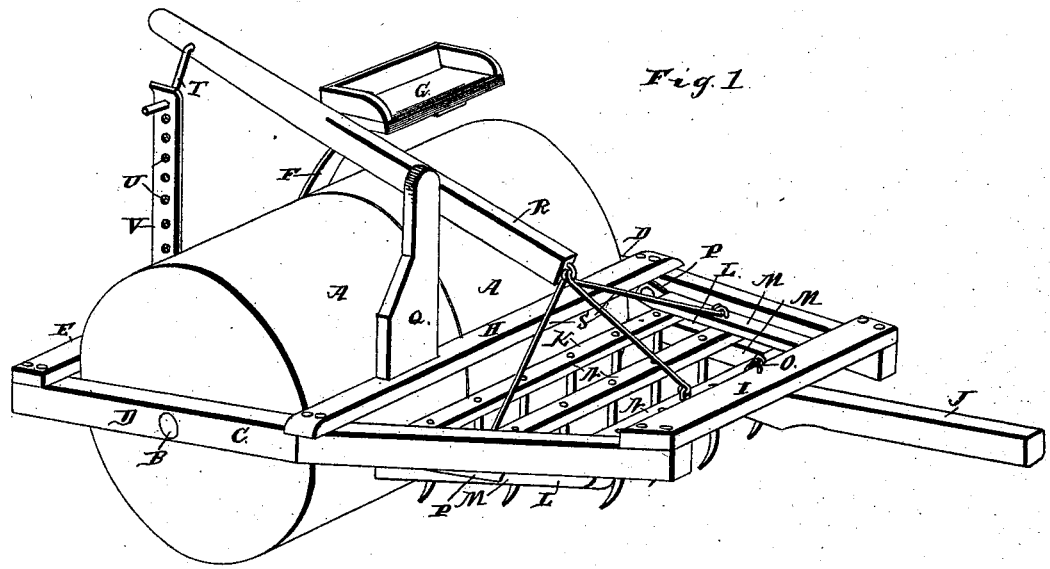
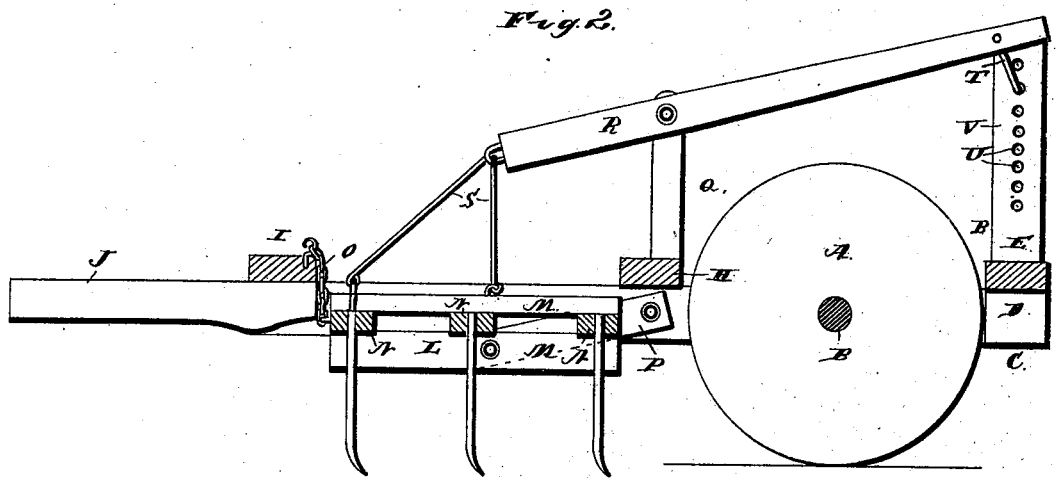
Witnesses
Geo. Thorpe
John H. Siggers
Inventor,
Lucius B. Phelps.
By his Attorneys, (No Model.) 2 Sheets—Sheet 2.

L. B. PHELPS.
LAND ROLLER AND HARROW.

No. 380,131. Patented Mar. 27, 1888.

Witnesses.

Inventor,
Lucius B. Phelps.

By his Attorneys.

United States Patent Office.

LUCIUS BARNES PHELPS, OF JEFFERSON, OHIO.

LAND-ROLLER AND HARROW.

SPECIFICATION forming part of Letters Patent No. 380,131, dated March 27, 1888.

Application filed November 29, 1887. Serial No. 256,453. (No model.)

*To all whom it may concern:*

Be it known that I, LUCIUS BARNES PHELPS, a citizen of the United States, residing at Jefferson, in the county of Ashtabula and State of Ohio, have invented a new and useful Improvement in Land-Rollers and Harrows, of which the following is a specification.

My invention relates to improvements in land-rollers and harrows; and it consists in certain novel features hereinafter described, and then pointed out in the claim.

Figure 3:
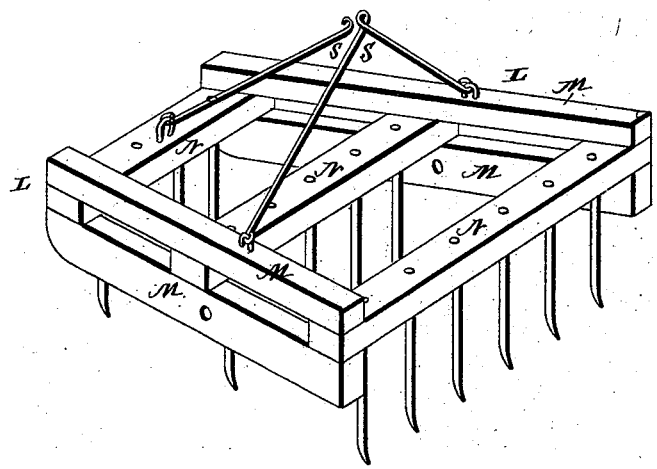
Figure 4:
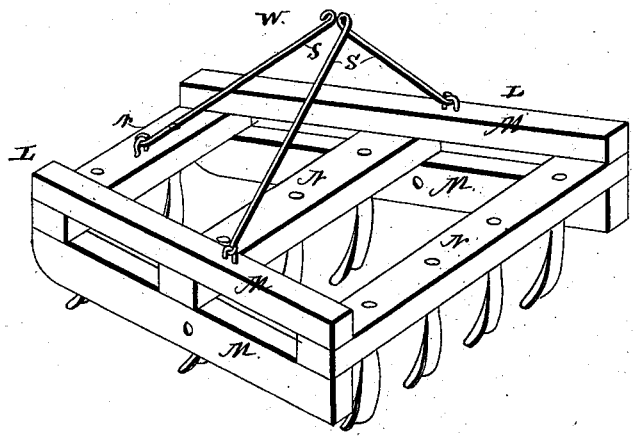

In the accompanying drawings, Figure 1 is a perspective view of my improved device. Fig. 2 is a longitudinal sectional view of the same. Fig. 3 is a detail perspective view of the harrow, and Fig. 4 is a detail perspective view of a cultivator which may be substituted for the harrow.

Referring to the drawings by letter, A designates the land-roller, which is made in sections, mounted on an axle, B, journaled in the side bars of the frame C. The side bars, D, of said frame C are connected at rear ends by a cross-bar, E, upon which I secure the upwardly and forwardly extending spring-bar F, on the free end of which the driver's seat G is secured. Just in front of the land-roller the frame C is provided with a cross-bar, H. In front of this cross-bar H the side bars, D, are inclined toward each other and connected at their front ends by a cross-bar, I, to which the tongue or draft-pole J is secured.

The harrow K is composed of the side bars, L, each of which is composed of the parallel branches M and the tooth-bars N, having their ends secured to said side bars and between the parallel branches of the same. The teeth are secured to the tooth-bars in the usual or any preferred manner.

In order to secure the harrow within the frame, I provide a chain, O, having its front end secured to the front cross-bar of the frame and its rear end secured to the front tooth-bar of the harrow, and the links P, having their front ends pivoted to the side bars of the harrow and their rear ends pivoted to the side bars of the frame A. A standard, Q, is erected upon the central cross-bar of the frame A, and to this standard I pivotally secure a lever, R, the front end of which is secured to the harrow by rods S. The rear end of this lever is provided with a swinging hook, T, which is adapted to engage one of a series of perforations, U, in a vertical bar, V, erected upon the rear cross-bar of the frame.

The cultivator W is similar in construction to the harrow, and is attached to the frame A in the same manner.

From the foregoing description it will be seen that I have provided a very simple and efficient device, by which the soil is thoroughly pulverized. The lever R is within convenient reach of the driver, and enables him to readily adjust the harrow to cut to a greater or less depth; or it may be raised entirely from the ground, as circumstances may render necessary. The lever is held at any desired adjustment by means of the swinging hook engaging the perforated bar.

The side bars, L, of the harrow can be adjusted not only up and down, but vertically, (so that the said bars always remain horizontal,) by means of the chain O and the links P. In other words, the rear and front ends of said bars can be raised and lowered equally.

Having thus described my invention, what I claim, and desire to secure by Letters Patent, is—

The combination, with the main frame, the rollers journaled in the rear portion thereof, the seat with its standard rising from the rear portion of the main frame and standing over the rollers, and the harrow swung in the front part of the main frame by the chain O and links P, of the upright a, the lever R, pivoted on said standard, the link-rods S, the standard U, provided with the perforations V, and the hook T, substantially as specified.

In testimony that I claim the foregoing as my own I have hereto affixed my signature in presence of two witnesses.

LUCIUS BARNES PHELPS.

Witnesses:
E. E. JONES,
D. C. PHELPS.